(12) United States Patent
Maguire et al.

(10) Patent No.: US 11,572,805 B2
(45) Date of Patent: Feb. 7, 2023

(54) SYSTEM FOR SUPPLYING LUBRICANT TO A COMPONENT

(71) Applicant: ROLLS-ROYCE plc, London (GB)

(72) Inventors: Alan R. Maguire, Derby (GB); Richard Sharpe, Leek (GB); Neil J. Davies, Derby (GB)

(73) Assignee: ROLLS-ROYCE PLC, London (GB)

(*) Notice: Subject to any disclaimer, the term of this patent is extended or adjusted under 35 U.S.C. 154(b) by 74 days.

(21) Appl. No.: 17/169,624

(22) Filed: Feb. 8, 2021

(65) Prior Publication Data
US 2021/0246811 A1 Aug. 12, 2021

(30) Foreign Application Priority Data
Feb. 11, 2020 (GB) ...................................... 2001830

(51) Int. Cl.
*F01D 25/20* (2006.01)
*F02C 7/06* (2006.01)
*F01M 1/02* (2006.01)

(52) U.S. Cl.
CPC .............. *F01D 25/20* (2013.01); *F01M 1/02* (2013.01); *F02C 7/06* (2013.01); *F01M 2001/0215* (2013.01); *F01M 2001/0253* (2013.01); *F01M 2001/0284* (2013.01)

(58) Field of Classification Search
CPC ........ F01D 25/20; F02C 7/06; F05D 2260/98; F01M 1/02; F01M 2001/023; F01M 2001/0238; F01M 2001/0246; F04B 1/324; F04B 1/146; F04B 1/295
See application file for complete search history.

(56) References Cited

U.S. PATENT DOCUMENTS

| 4,248,137 | A | * | 2/1981 | Caruso | F04B 1/324 91/375 R |
| 4,655,689 | A | * | 4/1987 | Westveer | F04B 1/324 60/449 |
| 5,064,351 | A | * | 11/1991 | Hamey | F04B 1/324 417/222.1 |
| 8,702,373 | B1 |  | 4/2014 | Valva et al. | |

(Continued)

FOREIGN PATENT DOCUMENTS

| EP | 3163034 A1 | 5/2017 |
| EP | 3543483 A1 | 9/2019 |

OTHER PUBLICATIONS

European search report dated Jul. 7, 2021, issued in EP Patent Application No. 21150826.

(Continued)

*Primary Examiner* — Andrew H Nguyen

(57) ABSTRACT

A system for supplying lubricant to a component of a gas turbine engine having a fan shaft is provided. The system includes a pump drivably couplable to the fan shaft for pumping lubricant to the component. The pump includes an inlet for receiving lubricant from a lubricant source, an outlet for outputting lubricant to the component and a swashplate movable between at least a first position and a second position. The system also includes a swashplate actuator for actuating the swashplate between the first position and the second position according to whether the fan shaft is rotating in a forward direction or a reverse direction opposite to the forward direction.

19 Claims, 13 Drawing Sheets

(56) References Cited

U.S. PATENT DOCUMENTS

2011/0030385 A1     2/2011    Ellans et al.
2015/0292359 A1    10/2015    Ketchum et al.
2017/0122330 A1*    5/2017    Mastro .................. F04D 29/325

OTHER PUBLICATIONS

Great Britan search report dated Jun. 25, 2020, issued in GB Patent Application No. 2001830.5.

* cited by examiner

SYSTEM FOR SUPPLYING LUBRICANT TO A COMPONENT

CROSS-REFERENCE TO RELATED APPLICATIONS

This specification is based upon and claims the benefit of priority from United Kingdom Patent Application Number 2001830.5, filed on 11 Feb. 2020, the entire contents of which are incorporated herein by reference.

BACKGROUND

Technical Field

The present disclosure relates to a system for supplying lubricant, and in particular to a system for supplying lubricant to a component of a gas turbine engine.

Description of the Related Art

A gas turbine engine typically includes a fan, a compressor section, a combustor section and a turbine section. Air entering the compressor section is compressed and delivered into the combustion section where it is mixed with fuel and ignited to generate an exhaust gas flow. The exhaust gas flow expands through the turbine section to drive the compressor and the fan.

A speed reduction device, such as a gearbox, may be utilized to drive the fan so that the fan may rotate at a speed different than the turbine section. Various components of the gearbox, such as bearings, may require lubrication during operation of the gas turbine engine.

The gearbox may also require lubrication when the gas turbine engine is not operational. For example, air moving through the non-operating gas turbine engine may rotate (i.e., windmill) the fan of the gas turbine engine in either clockwise or anti-clockwise directions. In some cases, windmilling may occur if the gas turbine engine shuts down during flight of an aircraft. In other cases, wind moving though the gas turbine engine on the ground may cause windmilling. Even though the gas turbine engine is not operating, rotation of the fan (in the clockwise or the anticlockwise directions) may necessitate lubrication of the gearbox.

SUMMARY

According to a first aspect there is provided a system for supplying lubricant to a component of a gas turbine engine having a fan shaft. The system includes a pump drivably couplable to the fan shaft for pumping lubricant to the component. The pump includes an inlet for receiving lubricant from a lubricant source, an outlet for outputting lubricant to the component, and a swashplate movable between at least a first position and a second position. The system further includes a swashplate actuator for actuating the swashplate between the first position and the second position according to whether the fan shaft is rotating in a forward direction or a reverse direction opposite to the forward direction. In the first position of the swashplate, the pump is operable to pump lubricant from the inlet to the outlet in response to the fan shaft rotating in the forward direction. In the second position of the swashplate, the pump is operable to pump lubricant from the inlet to the outlet in response to the fan shaft rotating in the reverse direction.

Such a system may allow for the supply of lubricant to the component independent of the direction of rotation of the fan shaft. The component may be one or more power gearbox (PGB) components, such as journal bearings, gear teeth, and the like. The system may supply lubricant to the component in the event of interruption in supply of lubricant from a main source. The system may also supply lubricant when the main source is not working, for example, during "windmilling" where the fan shaft rotates under the influence of wind and the like. Therefore, the system may ensure that the lubricant is supplied to the component even when gas turbine engine is not operational, by using the rotation of the fan shaft to drive the pump. Further, lubricant may be supplied to the component for both forward and reverse rotation of the fan shaft.

The swashplate actuator may be drivably couplable to the fan shaft so that the swashplate actuator moves the swashplate between the first actuator position and the second actuator position according to whether the fan shaft is rotating in the forward direction or the reverse direction.

The system may further comprise a sprag clutch for drivably engaging the swashplate actuator to the fan shaft in response to the fan shaft rotating in the reverse direction and disengaging the swashplate actuator from the fan shaft in response to the fan shaft rotating in the forward direction. In this way the swashplate actuator may only need to engage with the fan shaft when the fan shaft is rotating in the reverse direction, for example if the fan is windmilling.

The system may further comprise biasing means, for example a spring or another resilient biasing member, to bias the swashplate towards the first position or to bias the swashplate actuator towards a first actuator position corresponding to the first position.

The swashplate actuator may be movable between at least a first actuator position and a second actuator position. The first actuator position may correspond to the first position of the swashplate and the second actuator position may correspond to the second position of the swashplate.

The system may further include an actuator pump drivably couplable to the fan shaft and disposed in fluid communication with the swashplate actuator. The actuator pump may be configured to move the swashplate actuator to the second actuator position in response to the fan shaft rotating in the reverse direction.

The system may further include a sprag clutch for drivably engaging the actuator pump to the fan shaft in response to the fan shaft rotating in the reverse direction and disengaging the actuator pump from the fan shaft in response to the fan shaft rotating in the forward direction.

The sprag clutch may allow engagement of the actuator pump with the fan shaft only when the fan shaft rotates in the reverse direction, which typically corresponds to "windmilling" and associated scenarios. This may allow efficient and timely utilization of the actuator pump to move the swashplate actuator only for desired scenarios, while preventing any unnecessary operation of the actuator pump.

The system may further include biasing means, for example a spring or another resilient biasing member, configured to bias the swashplate actuator towards the first actuator position. Normally biasing the swashplate actuator towards the first actuator position may allow operation of the system when the fan shaft rotates in the forward direction, even without operation of the actuator pump. Whenever the fan shaft rotates in the reverse direction, the swashplate actuator may be actuated to move towards the second actuator position by the actuator pump.

The actuator pump may be further configured to move the swashplate actuator to the first actuator position in response to the fan shaft rotating in the forward direction.

The system may further include an alternator drivably couplable to the fan shaft and electrically connected with the swashplate actuator. The alternator may be configured to actuate the swashplate actuator so that the swashplate actuator moves the swashplate to the second position in response to the fan shaft rotating in the reverse direction.

The system may further include a sprag clutch for drivably engaging the alternator to the fan shaft in response to the fan shaft rotating in the reverse direction and disengaging the alternator from the fan shaft in response to the fan shaft rotating in the forward direction.

The sprag clutch may allow engagement of the alternator with the fan shaft only when the fan shaft rotates in the reverse direction, which typically corresponds to "windmilling" and associated scenarios. This may allow efficient and timely utilization of the alternator to move the swashplate actuator only for desired scenarios, while preventing any unnecessary operation of the alternator.

The system may further include biasing means, for example a spring or another resilient biasing member, configured to bias the swashplate to the first position or to bias the swashplate actuator towards a first actuator position corresponding to the first swashplate position.

The swashplate actuator may include a cylinder and a piston slidably received within the cylinder.

The swashplate actuator may include a centrifugal governor drivably couplable to the fan shaft and the swashplate. The centrifugal governor may be configured to move the swashplate to the first swashplate position in response to the fan shaft rotating in the forward direction. The centrifugal governor may be further configured to move the swashplate to the second swashplate position in response to the fan shaft rotating in the reverse direction.

The system may further include a sprag clutch for drivably engaging the centrifugal governor to the fan shaft in response to the fan shaft rotating in the reverse direction and disengaging the centrifugal governor from the fan shaft in response to the fan shaft rotating in the forward direction.

The sprag clutch may allow engagement of the centrifugal governor with the fan shaft only when the fan shaft rotates in the reverse direction, which typically corresponds to "windmilling" and associated scenarios. This may allow efficient and timely utilization of the centrifugal governor to move the swashplate actuator only for desired scenarios, while preventing any unnecessary operation of the centrifugal governor.

The centrifugal governor may be movable between at least a retracted state and an extended state. The retracted state may correspond to the first position of the swashplate and the extended state may correspond to the second position of the swashplate, or vice versa.

The centrifugal governor may further include biasing means, for example a spring or another resilient biasing member, configured to bias the centrifugal governor towards the retracted state.

The biasing means may normally bias the centrifugal governor towards the state in which the swashplate is in the first position. This may allow operation of the system when the fan shaft rotates in the forward direction even if the fan shaft is not engaged with the centrifugal governor. Whenever the fan shaft rotates in the reverse direction, the centrifugal governor may be actuated to move towards the other state.

The system may further include a second swashplate actuator configured to actuate the swashplate in response to the fan shaft rotating in the forward direction.

For example, the second swashplate actuator may be responsible for controlling the degree of actuation of the swashplate of the swashplate pump when the fan shaft is rotating in the forward direction. This may allow the amount of lubricant delivered to the component to be controlled during flight conditions. For example, the second swashplate actuator may be controlled by an engine EEC or another control unit of the engine to control the second swashplate actuator during flight conditions.

The system may further include a mechanical linkage coupling the swashplate actuator to the swashplate.

The system may further include a drive gear for drivably coupling the fan shaft and the pump.

A drive shaft of the actuator pump may be mounted in-line with a drive shaft of the pump. The in-line mounting of the drive shaft of the actuator pump with the drive shaft of the pump may cause the system to be simple, compact, and easy to implement in a gas turbine engine.

According to a second aspect there is provided a gas turbine engine for an aircraft. The gas turbine engine includes a fan shaft rotatable in a forward direction and a reverse direction opposite to the forward direction. The gas turbine engine further includes the system of the first aspect. The fan shaft of the gas turbine engine is drivably coupled to the pump of the system.

According to a third aspect there is provided an aircraft including the gas turbine engine of the second aspect.

The system of the present disclosure advantageously utilizes the rotation of the fan shaft to drive the pump irrespective of the direction of rotation of the fan shaft and the operational state of the gas turbine engine. The gas turbine engine of the present disclosure may therefore ensure lubricant supply to the component, such as the power gearbox, during both forward and reverse rotation of the fan shaft. Moreover, lubricant supply to the component may not be interrupted even during non-operating states of the gas turbine engine, such as during "windmilling".

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
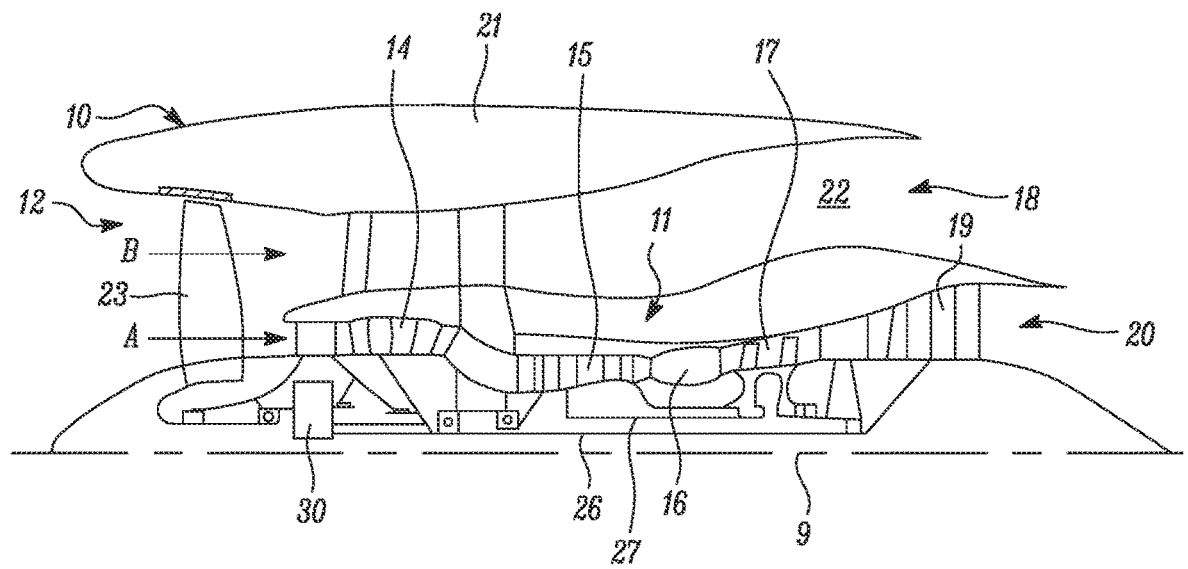
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two air-flows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
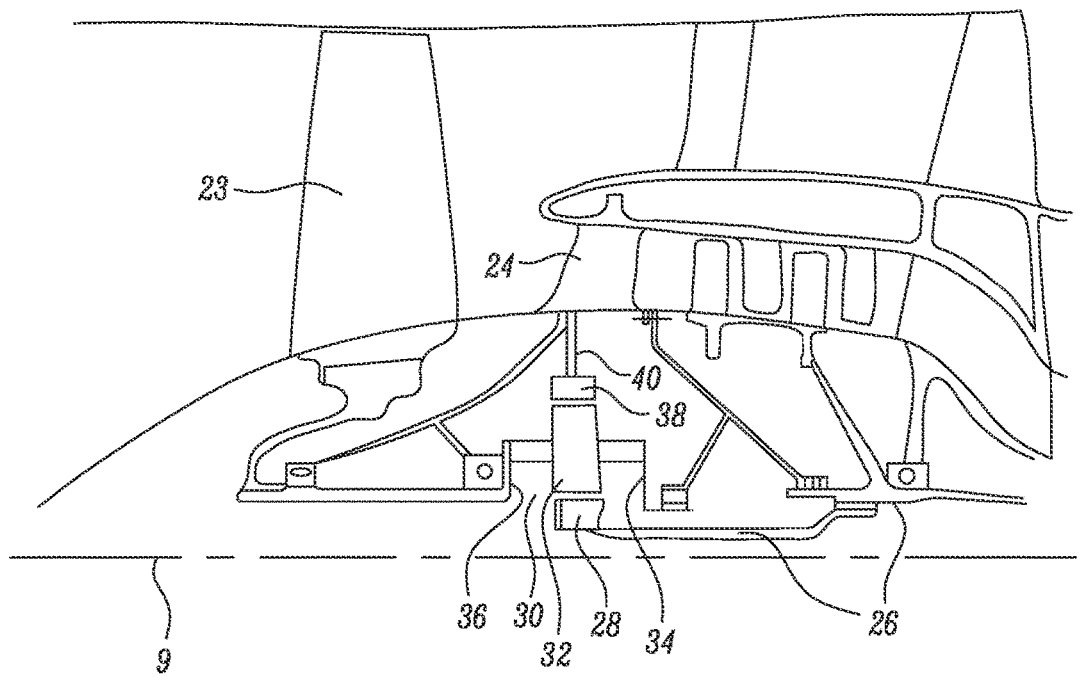
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
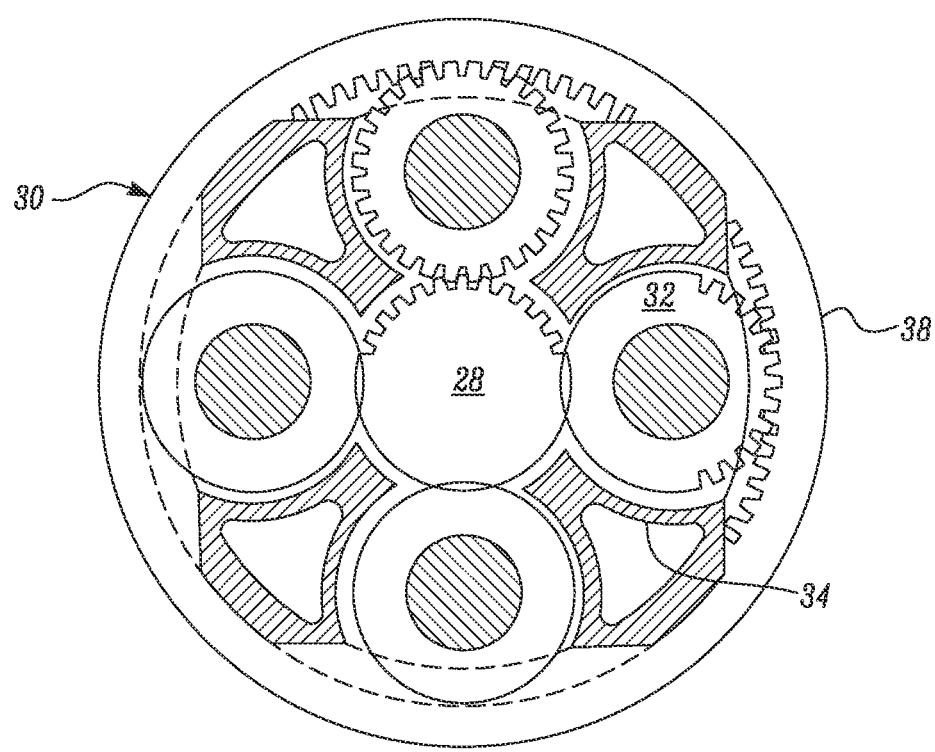
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

In addition, the present invention is equally applicable to aero gas turbine engines, marine gas turbine engines and land-based gas turbine engines.

Figure 4:
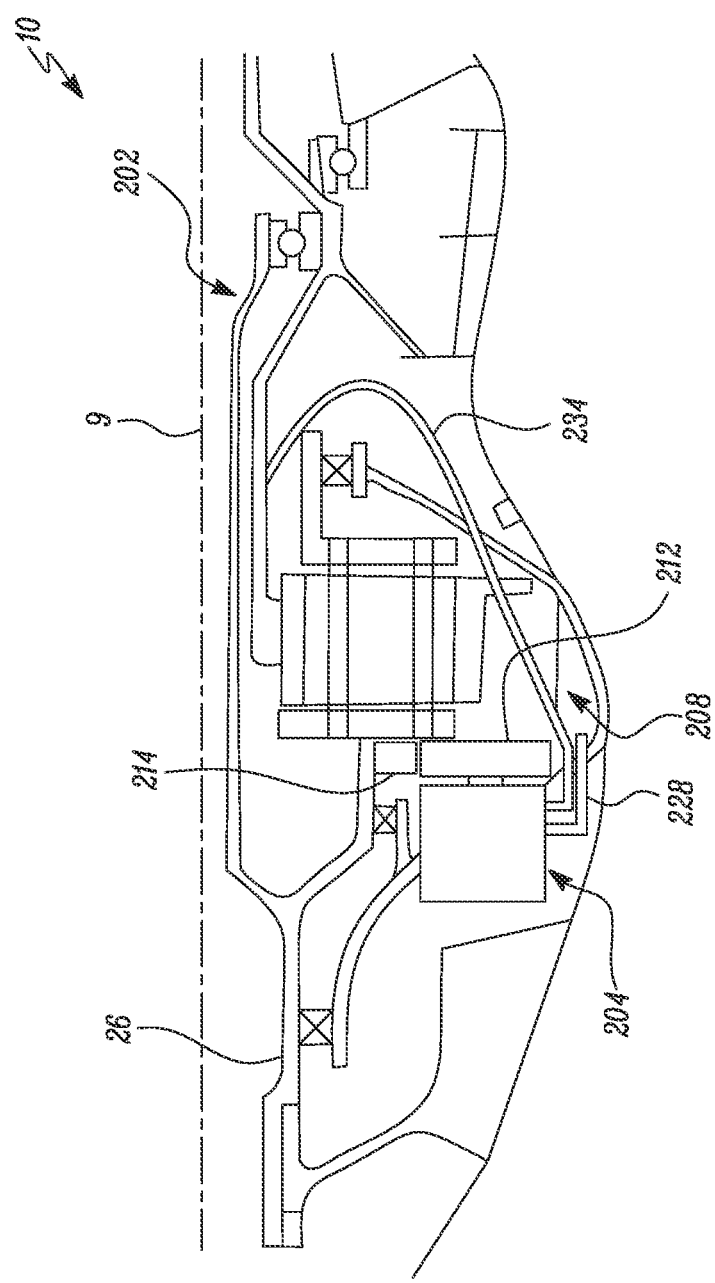
FIG. 4 is a schematic sectional view of a portion of a gas turbine engine.

FIG. 4 illustrates a portion of the gas turbine engine 10. The gas turbine engine 10 includes the fan shaft 26. Further, the gas turbine engine 10 includes a pump 204 drivably couplable to the fan shaft 26 for pumping lubricant to desired component(s) (for example, a component 202) of the gas turbine engine 10. The gas turbine engine 10 includes a lubricant source 208 to supply lubricant to the pump 204. In some embodiments, the lubricant source 208 may be a sump. In some other embodiments, the pump 204 may be supplied with lubricant by tapping into a main lubricant supply, for example via one or more non-return valves. As illustrated, the gas turbine engine 10 may include a series of supply lines, such as an auxiliary feed line 228 and an auxiliary supply line 234 among others. The auxiliary feed line 228 is provided between the lubricant source 208 and the pump 204. Further, the auxiliary supply line 234 is provided between the pump 204 and the component 202. The component 202 may include one or more power gearbox components. The component 202 may include one or more bearings, for example, journal bearings, roller bearings. The component 202 may also include gear teeth. For example, the pump 204 may supply lubricant to movable and intermeshed components of the gearbox of FIG. 2.

As shown in FIG. 4, the gas turbine engine includes a drive gear 214 for drivably coupling the fan shaft 26 and the pump 204. The drive gear 214 is further engaged with a pump gear 212 to drivably couple the fan shaft 26 and the pump 204. This allows utilization of the rotation of the fan shaft 26, such as during "windmilling", to drive the pump 204 and enable adequate lubricant supply to the component 202 of the gas turbine engine 10. The present disclosure allows lubrication by using a single pump (i.e., the pump 204) irrespective of the rotational sense/direction of the fan shaft 26.

Figure 5A:
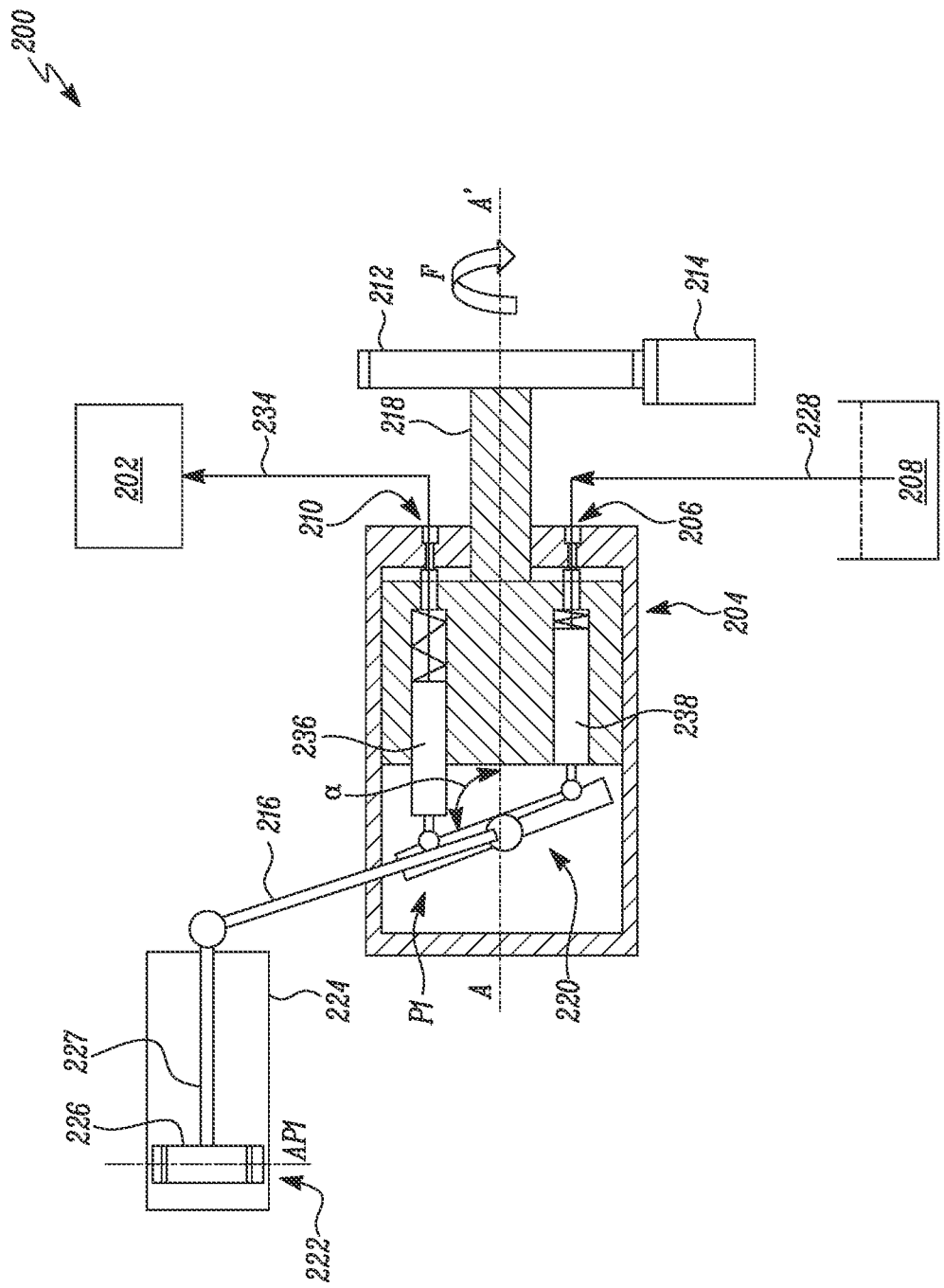
FIG. 5A is a schematic view of a system including a pump drivably couplable to a fan shaft rotating in a forward direction.

FIG. 5A illustrates a system 200 for supplying lubricant to the component 202 of the gas turbine engine 10. The system 200 includes the pump 204 drivably couplable to the fan shaft 26 (shown in FIG. 4) for pumping lubricant to the component 202. The pump 204 includes an inlet port 206 for receiving lubricant from the lubricant source 208, and an outlet port 210 for outputting lubricant to the component 202. As shown in FIG. 5A, the system 200 may include the series of supply lines, such as the auxiliary feed line 228 and the auxiliary supply line 234 among others. The auxiliary feed line 228 is provided between the lubricant source 208 and the inlet 206 of the pump 204. The auxiliary supply line 234 is provided between the outlet 210 of the pump 204 and the component 202.

The system 200 includes a swashplate 220, which is shown in a first position P1 in FIG. 5A. The first position P1 corresponds to a first angle α of the swashplate 220 with respect to a pump axis A-A'. The system 200 further includes a swashplate actuator 222 for actuating the swashplate 220 to and/or from the first position P1. In this example, the swashplate actuator 222 includes a cylinder 224 and a piston 226 slidably received within the cylinder 224. The swashplate actuator 222 further includes a piston rod 227 attached to and reciprocating with the piston 226. The piston rod 227 extends through the cylinder 224. In the first position P1 of the swashplate 220, the pump 204 is operable to pump lubricant from the inlet 206 to the outlet 210 in response to the fan shaft 26 rotating in a forward direction F.

The system 200 further includes a linkage, in this case a mechanical linkage 216, drivably coupling the swashplate actuator 222 to the swashplate 220. In this example the mechanical linkage 216 includes a single bar that is pivotally coupled to the piston rod 227 that is coupled to the piston 226 and fixedly connected to the swashplate 220. Other variations of the mechanical linkage 216 are possible and within the scope of the present disclosure. The mechanical linkage 216 may include multiple linkages such as, but not limited to, a 3-bar, 4-bar or higher set of bar linkages to suit application requirements. Further, the mechanical linkage 216 may be supplemented or even replaced by any other driving or coupling means as used or known in the relevant art.

Figure 5B:
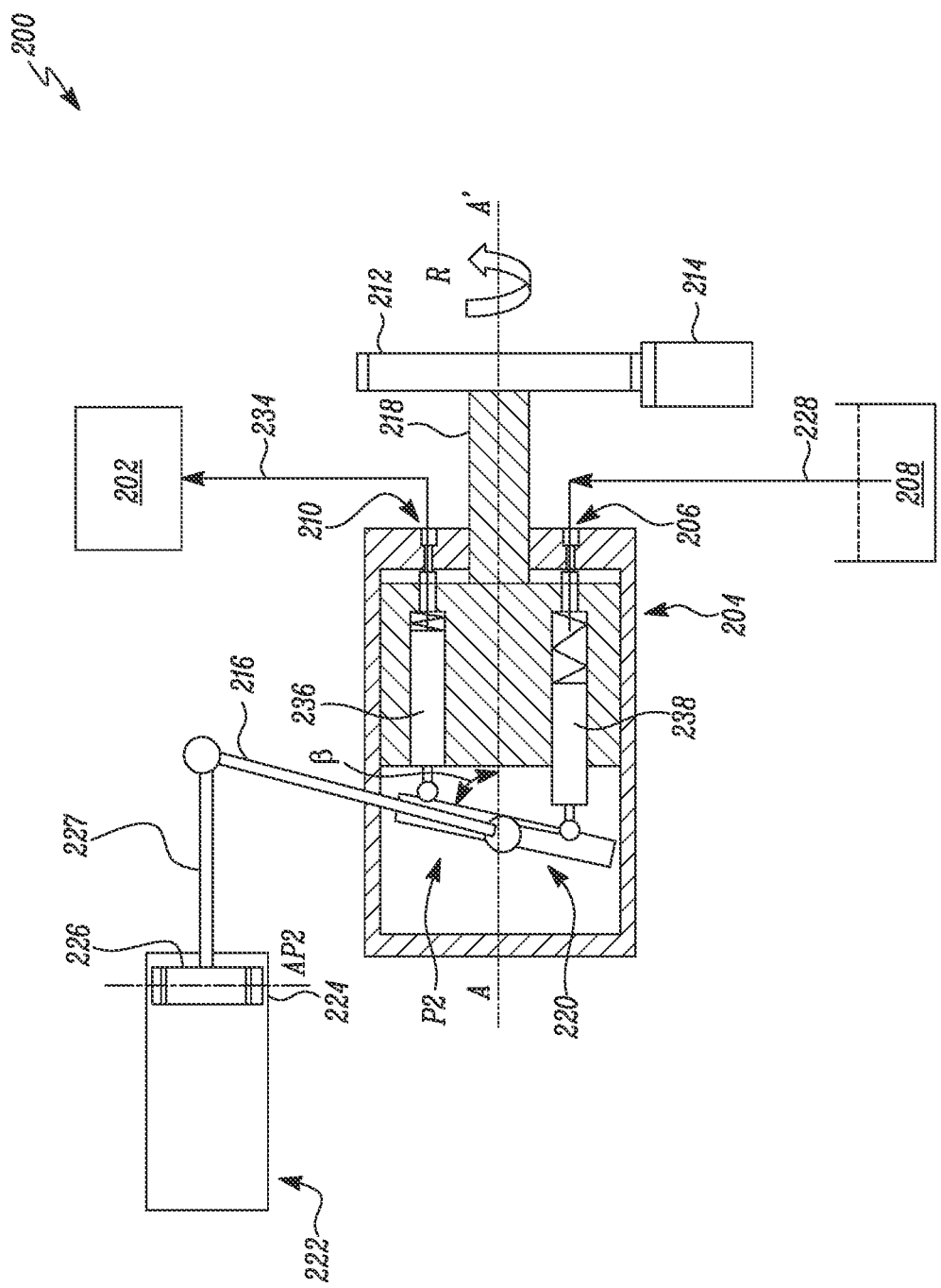
FIG. 5B is a schematic view of the system of FIG. 5A with the fan shaft rotating in a reverse direction.

FIG. 5B illustrates the fan shaft 26 rotating in a reverse direction R. As shown in FIG. 5B, with the fan shaft 25 rotating in the reverse direction R, the swashplate 220 is in a second position P2. The second position P2 corresponds to a second angle β of the swashplate 220 with respect to the pump axis A-A'. In the second position P2 of the swashplate 220, the pump 204 is operable to pump lubricant from the inlet 206 to the outlet 210 in response to the fan shaft 26 rotating in the reverse direction R. The difference between the first angle α and the second angle β may be substantially equal to 90 degrees.

The term "reverse direction R" is used in contrast to the "forward direction F". The forward direction is the 'normal' rotation direction of the fan, that is to say the direction the fan rotates when it is driven by the gas turbine engine 10. The forward direction F may be clockwise or anti-clockwise, depending on the design of the engine, and the reverse direction R is the opposite of the forward direction F. When not being driven, the fan shaft 26 may rotate (or "windmill") in either of the two directions, for example due to the direction of incident wind on the fan. Such cases may lead to inadequate lubrication since the lubricant may not be supplied to the component 202 by a primary lubrication unit that is typically only operational during operation of the gas turbine engine 10. The system 200 may ensure lubricant supply to the component 202 in response to rotation of the fan shaft 26 irrespective of an operational state of the gas turbine engine 10 and irrespective of the whether the fan shaft 26 is rotating in the forward direction F or the reverse direction R.

Referring to both FIGS. 5A and 5B, the system 200 includes the swashplate 220 movable between at least the first position P1 and the second position P2. The system 200 includes the swashplate actuator 222 for actuating the swashplate 220 between the first position P1 and the second position P2 according to whether the fan shaft 26 is rotating in the forward direction F (for example, clockwise direction) or the reverse direction R (for example, anti-clockwise direction) opposite to the forward direction F.

The system 200 may also include the drive gear 214 for drivably coupling the fan shaft 26 and the pump 204. The drive gear 214 meshes with the pump gear 212 to drivably couple the fan shaft 26 (shown in FIG. 4) and the pump 204. This arrangement of the drive gear 214 and the pump gear 212 is illustrative only and the present disclosure may include any other driving arrangement without any limitation. For example, one or more intermediate gears may be disposed between the drive gear 214 and the pump gear 212. Alternatively, or additionally, a friction drive, a chain drive, a belt drive, or combinations thereof may be used to drivably couple the pump 204 with the fan shaft 26.

FIG. 5A illustrates the drive gear 214 driving the pump gear 212 in the forward direction F, while FIG. 5B illustrates the drive gear 214 driving the pump gear 212 in the reverse direction R. The pump gear 212, in turn, drives a drive shaft 218 of the pump 204 which is operatively coupled to and drives a plurality of pump pistons 236, 238 to supply the lubricant from the inlet 206 to the outlet 210 and then to the component 202. Though two pump pistons 236, 238 are visible in FIGS. 5A, and 5B, the pump 204 may include any number of pump pistons based on application requirements. For example, the pump 204 may include an odd number (such as, 7, 9 etc.) of pistons to avoid high levels of fluid pressure induced vibration, among other reasons.

The first position P1 and the second position P2 of the swashplate 220 may be defined by the first angle α and the second angle β, respectively, between the swashplate 220 and the pump axis A-A'. In this example, the swashplate actuator 222 is movable between at least a first actuator position AP1 and a second actuator position AP2. The first actuator position AP1 corresponds to the first position P1 of the swashplate 220 and the second actuator position AP2 corresponds to the second position P2 of the swashplate 220. The piston 226 slidably moves within the cylinder 224 between the first actuator position AP1 (proximal to the cylinder end) and the second actuator position AP2 (proximal to the rod end) with respect to the cylinder 224. The first actuator position AP1 and the second actuator position AP2 may change and may depend upon the first position P1 and the second position P2 of the swashplate 220. Moreover, the first actuator position AP1 and the second actuator position AP2 may be controlled (in some embodiments by mechanical, hydroelectrical, and/or electrical means) to regulate the supply of the lubricant to the component 202.

In the example illustrated in FIGS. 5A and 5B, the pump 204 includes the pump pistons 236, 238 which are adapted to reciprocate while following an outer profile or a circumference end of the swashplate 220. The inlet 206 and the outlet 210 of the pump 204 remain unchanged and the pump 204 operates similarly independent of the direction of rotation of the fan shaft 26 due to actuation of the swashplate 220 between the first position P1 and the second position P2. The pump 204 may be an axial piston pump which drives the pump pistons 236, 238 due to rotation of the drive shaft 218 and engagement of the pump pistons 236, 238 with the swashplate 220. During operation of the pump 204, the pump pistons 236, 238 may reciprocate within a cylinder block that rotates with the drive shaft 218, as will be understood by those skilled in the art. The pump pistons 236, 238 may allow supply of the lubricant from the inlet 206 to the outlet 210. The inlet 206 of the pump 204 is fluidly coupled to the lubricant source 208 through the auxiliary feed line 228, while the outlet 210 of the pump 204 is fluidly coupled to the component 202 through the auxiliary supply line 234.

The swashplate actuator 222 may be actuated hydraulically, mechanically, electrically, pneumatically, or combinations thereof. Other examples of the present disclosure described hereinafter actuate the swashplate actuator 222 using different methods.

Figure 6A:
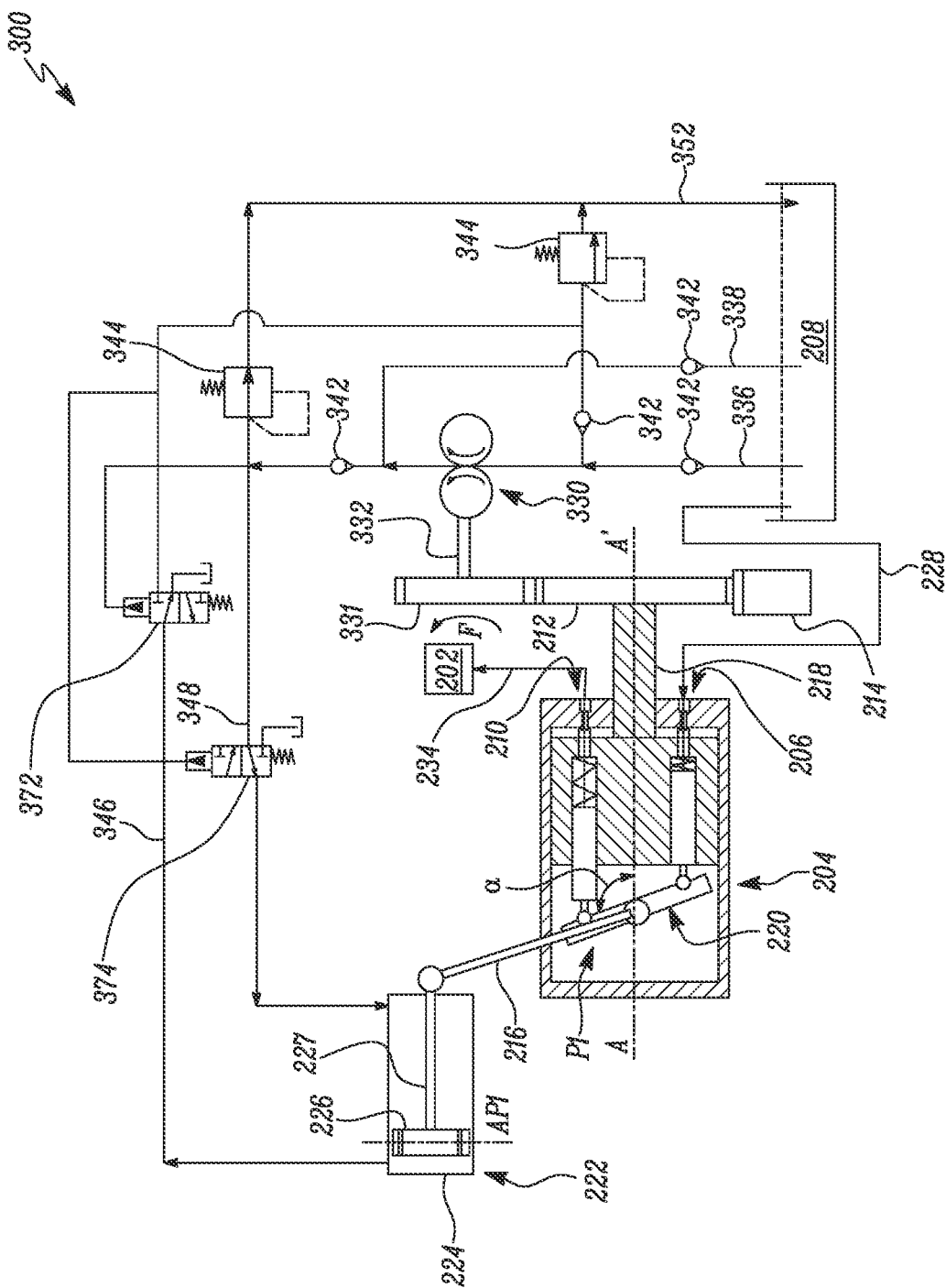
FIG. 6A is a schematic view of another system including a pump drivably couplable to a fan shaft rotating in a forward direction.

FIG. 6A illustrates another system 300 for supplying lubricant to the component 202 of the gas turbine engine 10. The system 300 includes the pump 204 drivably couplable to the fan shaft 26 (shown in FIG. 4) which in FIG. 6A is rotating in the forward direction F. The system 300 further includes an actuator pump 330 drivably couplable to the fan shaft 26 and disposed in fluid communication with the swashplate actuator 222. The actuator pump 330 hydraulically actuates the swashplate actuator 222. The pump 204 includes the swashplate 220 which in FIG. 6A is in the first position P1. The first position P1 corresponds to the first angle α of the swashplate 320 with respect to the pump axis A-A.

Both the systems 200, 300 include the pump 204 and the swashplate actuator 222. However, the system 300 hydraulically actuates the swashplate actuator 222. The actuator pump 330 is configured to keep the swashplate actuator 222 in the first actuator position AP1 in response to the fan shaft 26 rotating in the forward direction F. The actuator pump 330 may be a gear pump, but other types of pump as used or known in the relevant art may be used.

The system 300 includes the drive gear 214 for drivably coupling the fan shaft 26 and the pump 204. The drive gear 214 meshes with the pump gear 212 to couple the fan shaft 26 and the pump 204. Some components of the system 300 are structurally and functionally similar to equivalent components of the system 200. For instance, the system 300 includes components similar to the system 200, such as the mechanical linkage 216 coupling the swashplate actuator 222 to the swashplate 220. The system 300 further includes the auxiliary feed line 228 and the auxiliary supply line 234. The auxiliary feed line 228 is provided between the lubricant source 208 and the inlet 206 of the pump 204. Further, the auxiliary supply line 234 is provided between the outlet 210 of the pump 204 and the component 202.

The system 300 further includes a pump gear 331 for drivably coupling the drive gear 214 to the actuator pump 330. The pump gear 331 meshes with the drive gear 214 and drives the actuator pump 330 via a drive shaft 332.

The system 300 further includes one or more non-return valves 342 (NRVs 342) disposed in a forward feed line 336, a reverse feed line 338, and/or a return line 352. The one or more NRVs 342 may include a ball check valve, a diaphragm check valve, a swing check valve, a stop-check valve or a duckbill valve.

The forward feed line 336, the reverse feed line 338, and the return line 352 fluidly connect the swashplate actuator 222 to the lubricant source 208. Further, one or more pressure relief valves 344 (PRVs 344) may be provided in fluid communication with the forward feed line 336, the reverse feed line 338, and/or the return line 352. As illustrated, one of the PRVs 344 is provided in a first feed line 346 and the return line 352, while the other PRV 344 is in fluid communication with a second feed line 348. The first feed line 346 fluidly communicates the swashplate actuator 222 with the forward feed line 336. Specifically, the first feed line 346 fluidly communicates a cylinder end chamber of the swashplate actuator 222 with the forward feed line 336. The second feed line 348 fluidly communicates the swashplate actuator 222 with the forward feed line 336 and the return line 352. Specifically, the second feed line 348 fluidly communicates a rod end chamber of the swashplate actuator 222 with the forward feed line 336 and the return line 352. Although the present disclosure illustrates and describes hydraulic circuits having the NRVs 342, the PRVs 344, and the feed lines (i.e., the forward feed line 336, the reverse feed line 338, and the return line 352), alternative circuit arrangements or configurations may be used and will occur to those skilled in the art.

The first feed line 346 includes a flow direction control valve (FDCV) 372, while the second feed line 348 includes a flow direction control valve (FDCV) 374. The FDCVs 372, 374 may ensure desired movement of the piston 226 of the swashplate actuator 222 without inadvertent opening of the PRVs 344. Specifically, the FDCVs 372, 374 may ensure desired movement of the piston 226 of the swashplate actuator 222 prior to the opening of the PRVs 344.

FIG. 6A illustrates the first feed line 346 and the second feed line 348 allowing flow of the lubricant to and from the swashplate actuator 222 corresponding to the first actuator position AP1 of the piston 226. As illustrated herein, movement of the piston 226 towards the cylinder end of the cylinder 224 (i.e., near the first actuator position AP1) allows flow of the lubricant from the swashplate actuator 222 through the first feed line 346. Further, the second feed line 348 allows flow of the lubricant to the swashplate actuator 222. One PRV 344 may allow flow from the first feed line 346 to the return line 352 when a pressure in the first feed line 346 crosses a threshold. The other PRV 344 may remain closed. The actuator pump 330 rotates in the forward direction F when the fan shaft 26 rotates in the forward direction F.

Figure 6B:
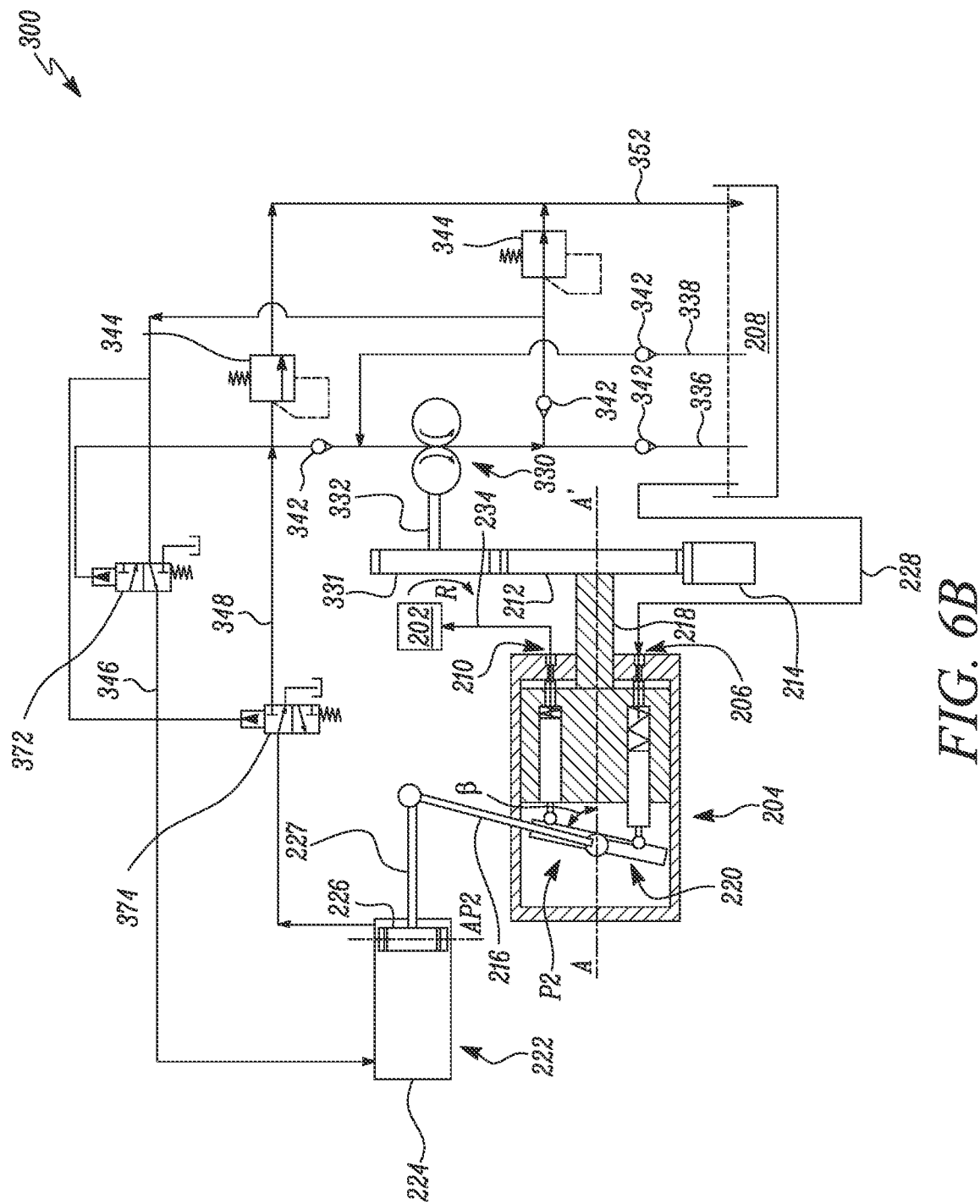
FIG. 6B is a schematic view of the system of FIG. 6A with the fan shaft rotating in a reverse direction.

FIG. 6B illustrates the system 300 when the fan shaft 26 is rotating in the reverse direction R. The actuator pump 330 is configured to move the swashplate actuator 222 to the second actuator position AP2 in response to the fan shaft 26 rotating in the reverse direction R. Each of the first feed line 346 and the second feed line 348 may experience a change or reversal in a direction of flow of the lubricant for the second actuator position AP2. As illustrated herein, movement of the piston 226 towards the piston end of the cylinder (i.e., near the second actuator position AP2) allows flow of the lubricant from the swashplate actuator 222 through the second feed line 348. Further, the first feed line 346 now allows flow of the lubricant to the swashplate actuator 222. One PRV 344 may allow flow from the second feed line 348 to the return line 352 when a pressure in the second feed line 348 crosses a threshold. The other PRV 344 may remain closed. The actuator pump 330 rotates in the reverse direction R when the fan shaft 26 rotates in the reverse direction R.

Referring to FIGS. 6A and 6B, the NRVs 342 may enable desired flows of the lubricant through the forward feed line 336, the reverse feed line 338, the first feed line 346 and the second feed line 348 based on the forward rotation of the fan shaft 26 and the reverse rotation of the fan shaft 26. One NRV 342 may allow unidirectional flow from the lubricant source 208 to the forward feed line 336. One NRV 342 may allow unidirectional flow from the lubricant source 208 to the reverse feed line 338. One NRV 342 may allow unidirectional flow from the forward feed line 336 to the first feed line 346. One NRV 342 may allow unidirectional flow from the forward feed line 346 to the second feed line 348. The FDCVs 372, 374 may also control the direction of flow of the lubricant between the swashplate actuator 222 and the lubricant source 208.

Upon rotation of the fan shaft 26 in the forward direction F, lubricant flows from the lubricant source 208, through the forward feed line 336, to the actuator pump 330. The actuator pump 330 supplies the lubricant to the swashplate actuator 222 via the second feed line 348 such that the swashplate actuator 222 moves to the first actuator position AP1 and the swashplate 220 moves to the first position P1.

Upon rotation of the fan shaft 26 in the reverse direction R, lubricant flows from the lubricant source 208, through the reverse feed line 338, to the actuator pump 330. The actuator pump 330 supplies the lubricant to the swashplate actuator 222 via the first feed line 346 such that the swashplate actuator 222 moves to the second actuator position AP2 and the swashplate 220 moves to the second position P2.

Figure 7:
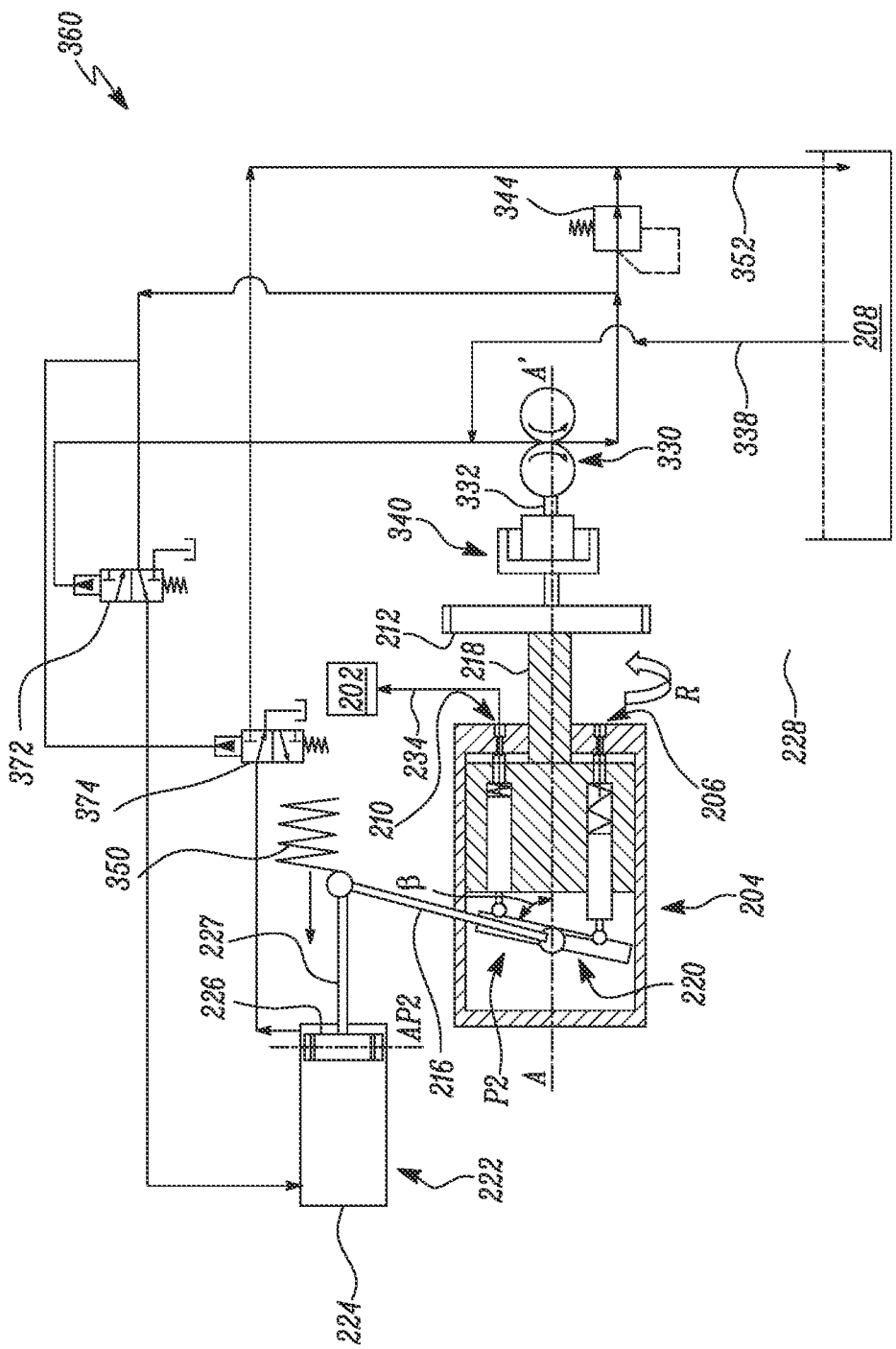
FIG. 7 is a schematic view of a system including a pump drivably couplable to a fan shaft by a sprag clutch.

FIG. 7 illustrates another system 360 that is similar to the system 300 of FIGS. 6A and 6B. However, the system 360 further includes a sprag clutch 340 for drivably engaging the actuator pump 330 to the fan shaft 26 in response to the fan shaft 26 rotating in the reverse direction R (as illustrated in FIG. 7) and disengaging the actuator pump 330 from the fan shaft 26 in response to the fan shaft 26 rotating in the forward direction F (shown in FIG. 6A). In this way the actuator pump 330 may only be driven when the fan shaft 26 is rotating in the reverse direction R. To ensure the swashplate 220 is in the correct position during forward direction F rotation of the fan shaft, the system 360 may further include biasing means (a spring 350 in FIG. 7) configured to bias the swashplate actuator 222 towards the first actuator position AP1 (shown in FIG. 6A). The spring 350 may normally bias the swashplate actuator 222 in the first actuator position AP1, such that the swashplate 220 is also normally in the first position P1. The sprag clutch 340 may ensure that the actuator pump 330 is inoperative during rotation of the fan shaft 26 in the forward direction F. The sprag clutch 340 may allow actuation of the actuator pump 330 by the drive gear 214 upon rotation of the fan shaft 26 in the reverse direction R. The system 360 also includes one PRV 344.

The pump 204 and the actuator pump 330 may have interconnecting passages and can be contained within a common pump housing as a single line replaceable unit (LRU). In this example the drive shaft 332 of the actuator pump 330 is mounted in-line with the drive shaft 218 of the pump 204. This may reduce a number of parts (e.g., bearings, gears, mount features etc.) of the system 360, thereby providing improved packaging and reliability.

Figure 8:
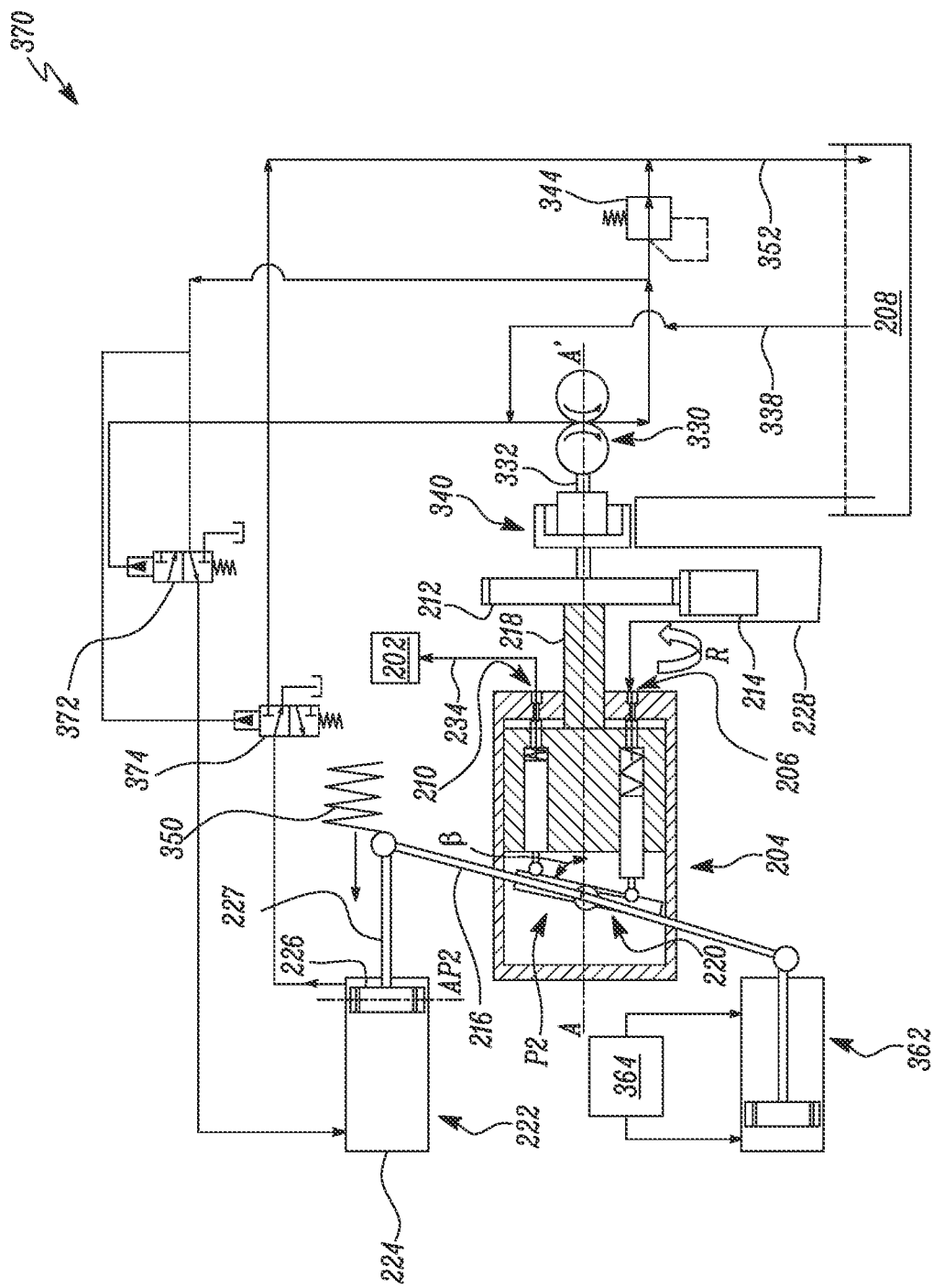
FIG. 8 is a schematic view of a system including a pump drivably couplable to a fan shaft and two swashplate actuators.

FIG. 8 illustrates another system 370 that is similar to the system 360 of FIG. 7. However, the system 370 further includes a second swashplate actuator 362 configured to actuate the swashplate 220 in response to the fan shaft 26 rotating in the forward direction F. The second swashplate actuator 362 may be actuated by an electronic engine controller (EEC) 364. In some other embodiments, the second swashplate actuator 362 may be electrically actuated by another controller of the gas turbine engine 10 or aircraft. The system 300 further includes a biasing means (in this case a spring 350) configured to bias the swashplate actuator 222 towards the first actuator position AP1. The EEC 364 may control an angle of the swashplate 220, and hence lubricant supply to the component 202 during operation of the gas turbine engine 10. The EEC 364 may, for example, allow reduction in lubricant supply during cruise conditions of the aircraft.

Figure 9A:
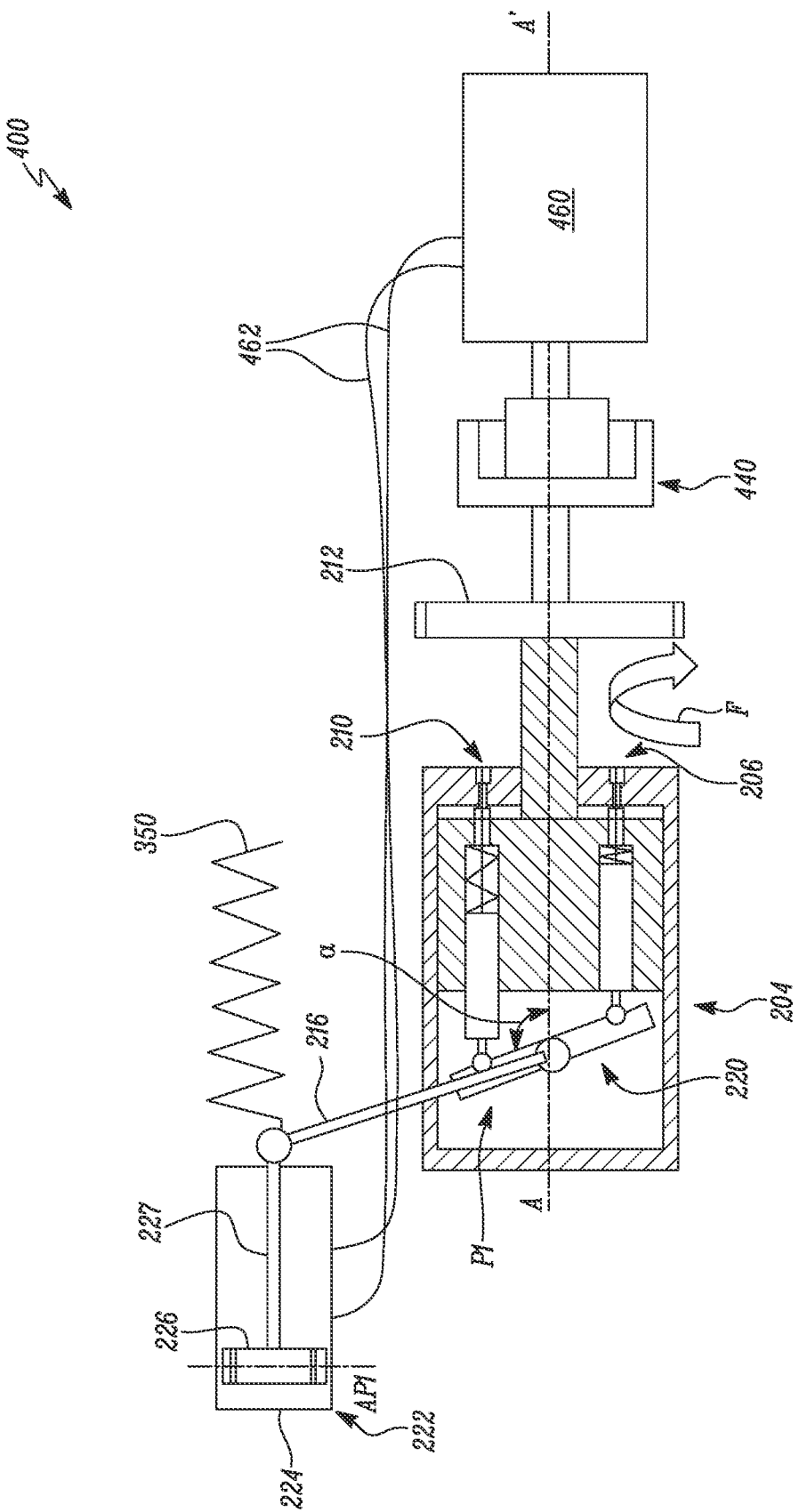
FIG. 9A is a schematic view of a system including a pump and alternator drivably couplable to a fan shaft rotating in a forward direction.
Figure 9B:
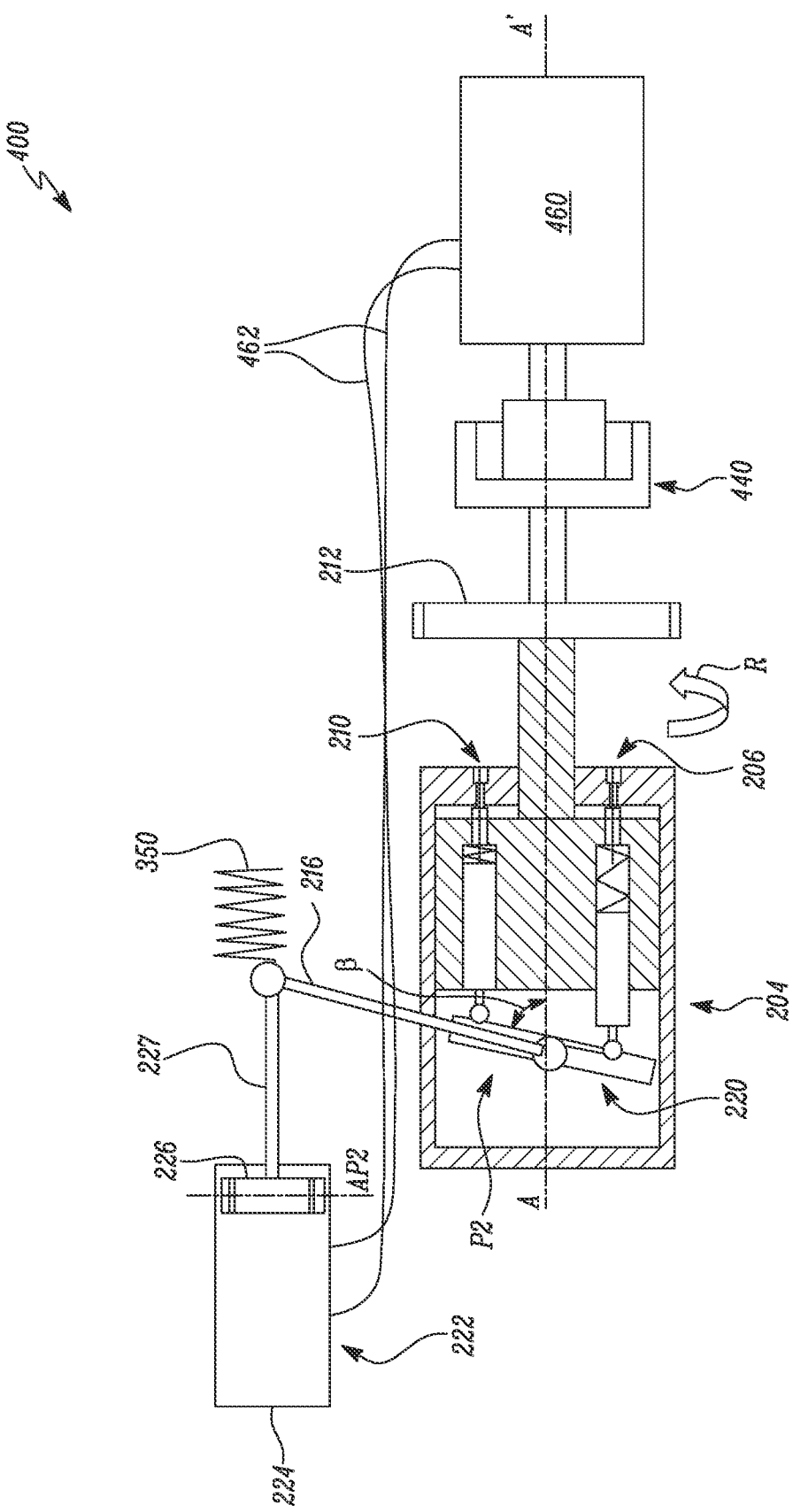
FIG. 9B is a schematic view of the system of FIG. 9A with the fan shaft rotating in a reverse direction.

FIG. 9A illustrates a system 400 including the pump 204, the swashplate actuator 222 and the mechanical linkage 216. The system 400 further includes a sprag clutch 440 and an alternator 460, which may be a permanent magnet alternator. The alternator 460 is drivably couplable to the fan shaft 26 and electrically connected with the swashplate actuator 222 by means of electrical lines 462. The alternator 460 is configured to move the swashplate actuator 222 to the second actuator position AP2 in response to the fan shaft 26 rotating in the reverse direction R, as illustrated in FIG. 9B. The system 400 further includes biasing means (in this case a spring 350) configured to bias the swashplate actuator 222 towards the first actuator position AP1. During rotation of the fan shaft 26 in the reverse direction R, the pump gear 212 rotates the alternator 460 which, in turn, generates electric current for actuation of the swashplate actuator 222. Though the swashplate actuator 222 is shown as having a piston-cylinder arrangement in FIG. 9A, the swashplate actuator 222 may be an electrical solenoid device that is activated based on availability of electrical energy from the alternator 460.

The system 400 is structurally and functionally similar to the system 360 of FIG. 7. However, the system 400 electrically actuates the swashplate actuator 222 via the alternator 460. The sprag clutch 440 drivably engages the alternator 460 to the fan shaft 26 in response to the fan shaft 26 rotating in the reverse direction R (as illustrated in FIG. 9B) and disengages the alternator 460 from the fan shaft 26 in response to the fan shaft 26 rotating in the forward direction F (as illustrated in FIG. 9A). This may ensure that the alternator 460 remains disengaged from the fan shaft 26 during normal operation of the gas turbine engine 10, i.e., when the fan shaft 26 is driven and rotating in the forward direction F. Moreover, since the alternator 460 only engages with the fan shaft 26 during the reverse direction R of the fan shaft 26 to ensure desired supply of the lubricant, wear may be reduced and the efficiency of the system 400 improved.

The spring 350, shown FIGS. 7, 8, 9A and 9B, may be supplemented or replaced with any other biasing means such as, but need not limited to, cams and bellows.

Figure 10A:
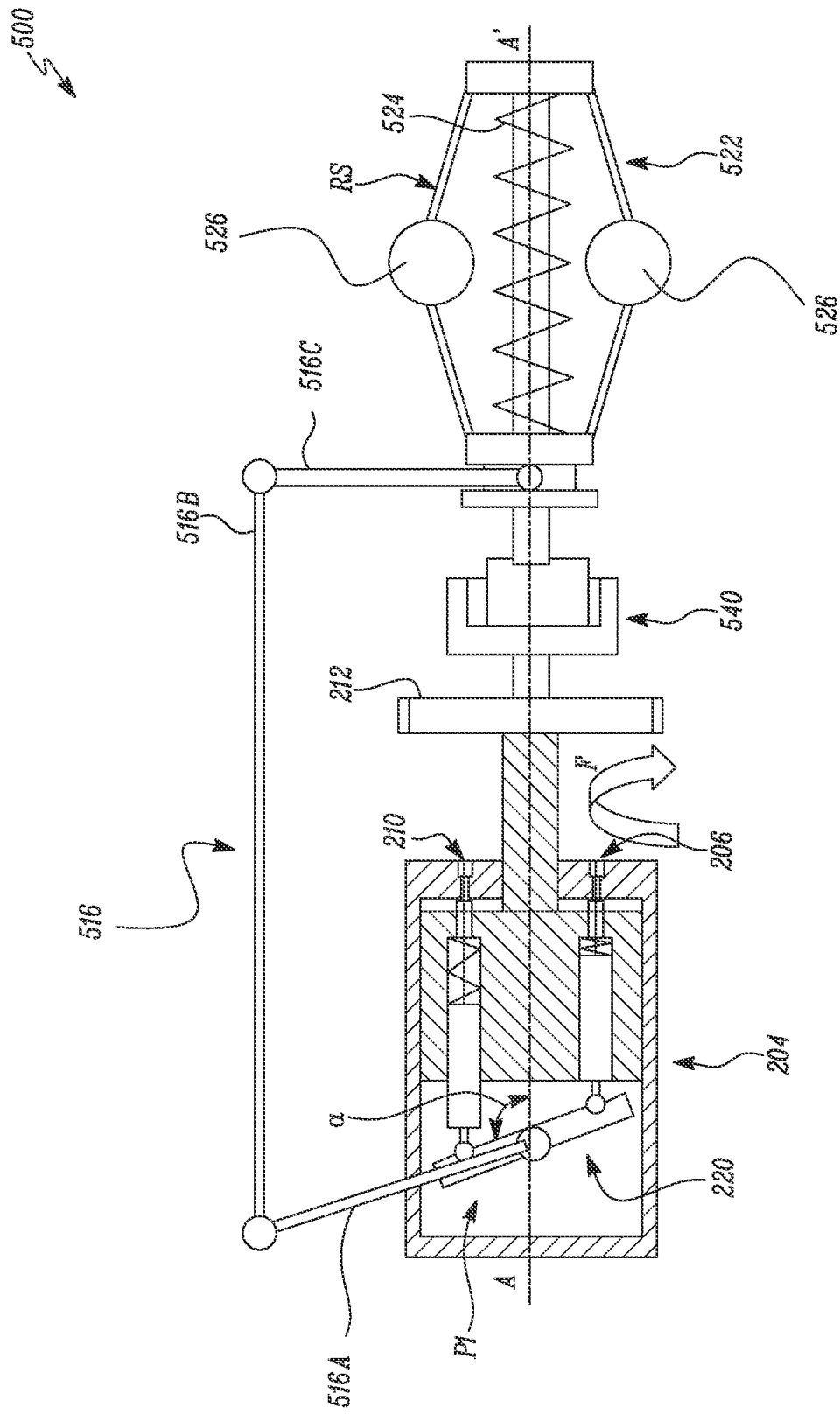
FIG. 10A is a schematic view of a pump and a governor drivably couplable to a fan shaft rotating in a forward direction.

FIG. 10A illustrates another system 500 including the pump 204 driven by the pump gear 212. However, the system 500 mechanically actuates the swashplate 220 using a swashplate actuator 522 in the form of a centrifugal governor. The centrifugal governor 522 is drivably couplable to the fan shaft 26 and the swashplate 220. The centrifugal governor 522 is configured to move the swashplate 220 to the first position P1 in response to the fan shaft 26 rotating in the forward direction F. The centrifugal governor 522 is further configured to move the swashplate 220 to the second position P2 in response to the fan shaft 26 rotating in the reverse direction R, as illustrated in FIG. 10B.

The system 500 further includes a drive gear (not shown) for drivably coupling the fan shaft 26 and the pump 204. The drive gear is engaged with the pump gear 212 to drivably couple the fan shaft 26 and the pump 204. The system 500 further includes a linkage 516 coupling the centrifugal governor 522 to the swashplate 220. In this example, the linkage 516 is a mechanical linkage 516 and includes three bars 516A, 516B, 516C. The bar 516A is fixedly coupled to the swashplate 220, the bars 516A and 516B are pivotably coupled to each other, the bars 516B and 516C are pivotably coupled to each other, and bar 516C is fixedly coupled to the centrifugal governor 522. It will be understood that the centrifugal governor 522 and the swashplate 220 may be coupled by any other type of mechanical linkage.

The system 500 may further include a sprag clutch 540 for drivably engaging the centrifugal governor 522 to the fan shaft 26 in response to the fan shaft 26 rotating in the reverse direction R and disengaging the centrifugal governor 522 from the fan shaft 26 in response to the fan shaft 26 rotating in the forward direction F.

Figure 10B:
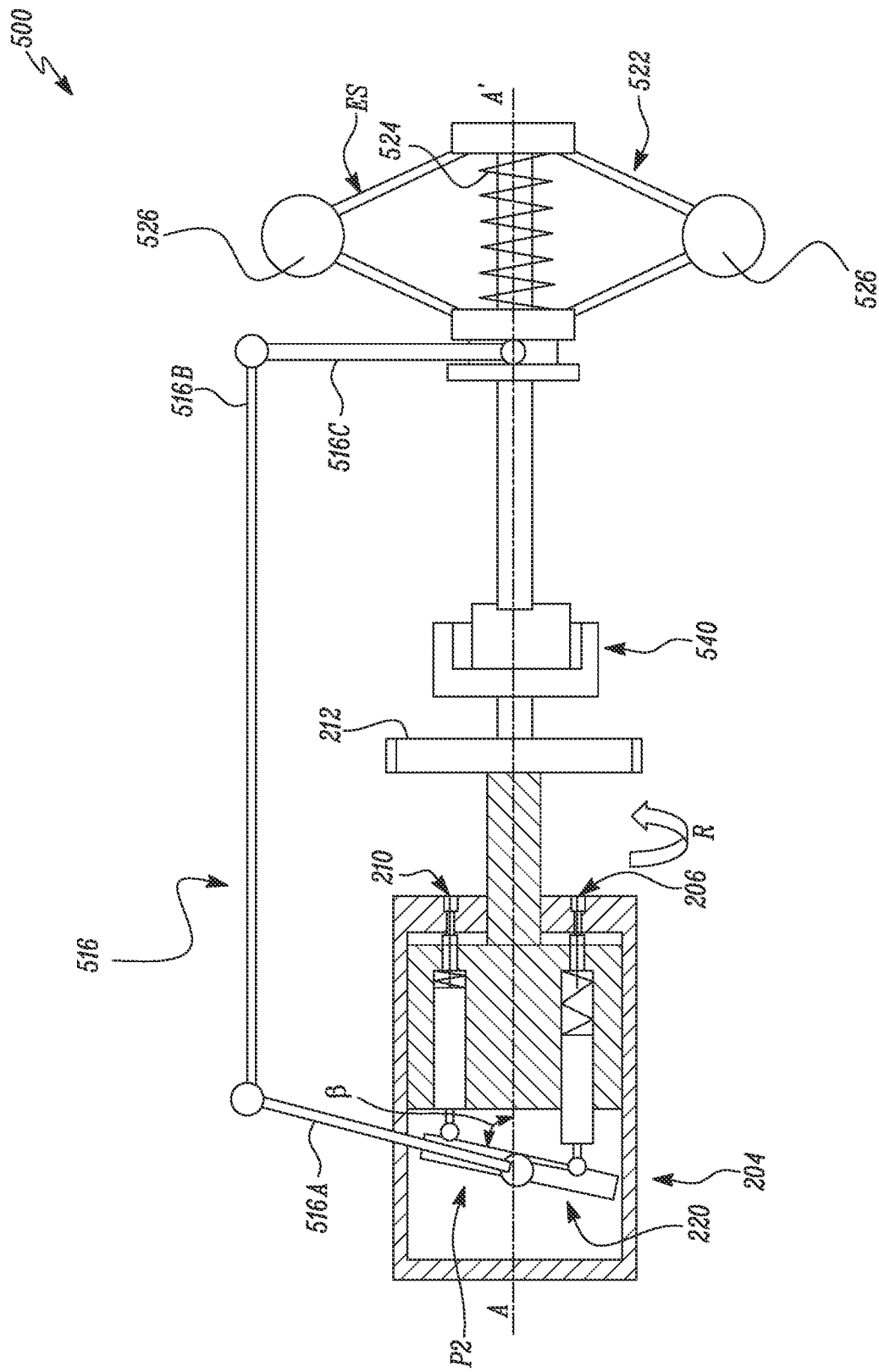
FIG. 10B is a schematic view of the system of FIG. 10A with the fan shaft rotating in a reverse direction.

The centrifugal governor 522 may be movable between at least a retracted state RS and an extended state ES, as illustrated in FIGS. 10A, and 10B, respectively. In this example the retracted state RS corresponds to the first position P1 of the swashplate 220 and the extended state ES corresponds to the second position P2 of the swashplate 220. The centrifugal governor 522 further includes biasing means (in this case a spring 524) configured to bias the centrifugal governor 522 towards the retracted state RS.

In the example of FIGS. 9A and 9B, the centrifugal governor 522 is a two-ball governor. In the retracted state RS, the balls 526 of the centrifugal governor 522 are radially retracted relative to a governor axis. Further, the centrifugal governor 522 is disengaged from the pump gear 212 by the sprag clutch 540 during rotation of the fan shaft 26 in the forward direction F. The sprag clutch 540 engages the pump gear 212 with the centrifugal governor 522 upon rotation of the fan shaft 26 in the reverse direction R. The pump gear 212 rotates the centrifugal governor 522 causing each of the balls 526 to move to a radially extended position relative to the governor axis.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A system for supplying lubricant to a component of a gas turbine engine having a fan shaft, the system comprising:
   a pump drivably couplable to the fan shaft for pumping lubricant to the component, the pump comprising an inlet for receiving lubricant from a lubricant source, an outlet for outputting lubricant to the component and a swashplate movable between at least a first position and a second position; and
   a swashplate actuator for actuating the swashplate between the first position and the second position according to whether the fan shaft is rotating in a forward direction or a reverse direction opposite to the forward direction,
   wherein, in the first position of the swashplate, the pump is operable to pump lubricant from the inlet to the outlet in response to the fan shaft rotating in the forward direction, and wherein, in the second position of the swashplate, the pump is operable to pump lubricant from the inlet to the outlet in response to the fan shaft rotating in the reverse direction.

2. The system of claim 1, wherein the swashplate actuator is drivably couplable to the fan shaft so that the swashplate actuator moves the swashplate between the first position and the second position according to whether the fan shaft is rotating in the forward direction or the reverse direction.

3. The system of claim 2, further comprising a sprag clutch for drivably engaging the swashplate actuator to the fan shaft in response to the fan shaft rotating in the reverse direction and disengaging the swashplate actuator from the fan shaft in response to the fan shaft rotating in the forward direction.

4. The system of claim 1, wherein the swashplate actuator is movable between at least a first actuator position and a second actuator position, wherein the first actuator position corresponds to the first position of the swashplate and the second actuator position corresponds to the second position of the swashplate.

5. The system of claim 4, further comprising an actuator pump drivably couplable to the fan shaft and disposed in fluid communication with the swashplate actuator, wherein the actuator pump is configured to move the swashplate actuator to the second actuator position in response to the fan shaft rotating in the reverse direction.

6. The system of claim 5, further comprising a sprag clutch for drivably engaging the actuator pump to the fan shaft in response to the fan shaft rotating in the reverse direction and disengaging the actuator pump from the fan shaft in response to the fan shaft rotating in the forward direction.

7. The system of claim 6, wherein a drive shaft of the actuator pump is mounted in-line with a drive shaft of the pump.

8. The system of claim 5, wherein the actuator pump is further configured to move the swashplate actuator to the first actuator position in response to the fan shaft rotating in the forward direction.

9. The system of claim 1, further comprising an alternator drivably couplable to the fan shaft and electrically connected with the swashplate actuator, wherein the alternator is configured to actuate the swashplate actuator so that the swashplate actuator moves the swashplate to the second position in response to the fan shaft rotating in the reverse direction.

10. The system of claim 9, further comprising a sprag clutch for drivably engaging the alternator to the fan shaft in response to the fan shaft rotating in the reverse direction and disengaging the alternator from the fan shaft in response to the fan shaft rotating in the forward direction.

11. The system of claim 1, wherein the swashplate actuator comprises a cylinder and a piston slidably received within the cylinder.

12. The system of claim 1, wherein the swashplate actuator comprises a centrifugal governor drivably couplable to the fan shaft and the swashplate, wherein the centrifugal governor is configured to move the swashplate to the first position in response to the fan shaft rotating in the forward direction, and wherein the centrifugal governor is further configured to move the swashplate to the second position in response to the fan shaft rotating in the reverse direction.

13. The system of claim 12, further comprising a sprag clutch for drivably engaging the centrifugal governor to the fan shaft in response to the fan shaft rotating in the reverse direction and disengaging the centrifugal governor from the fan shaft in response to the fan shaft rotating in the forward direction.

14. The system of claim 12, wherein the centrifugal governor is movable between at least a retracted state and an extended state, wherein the retracted state corresponds to the first position of the swashplate and the extended state corresponds to the second position of the swashplate.

15. The system of claim 1, further comprising a second swashplate actuator configured to actuate the swashplate in response to the fan shaft rotating in the forward direction.

16. The system of claim 1, further comprising a mechanical linkage coupling the swashplate actuator to the swashplate.

17. The system of claim 1, further comprising a drive gear for drivably coupling the fan shaft and the pump.

18. A gas turbine engine for an aircraft, the gas turbine engine comprising:
    a fan shaft rotatable in a forward direction and a reverse direction opposite to the forward direction; and
    the system of claim 1, wherein the fan shaft is drivably coupled to the pump.

19. An aircraft comprising the gas turbine engine of claim 18.

* * * * *